Figure 1:
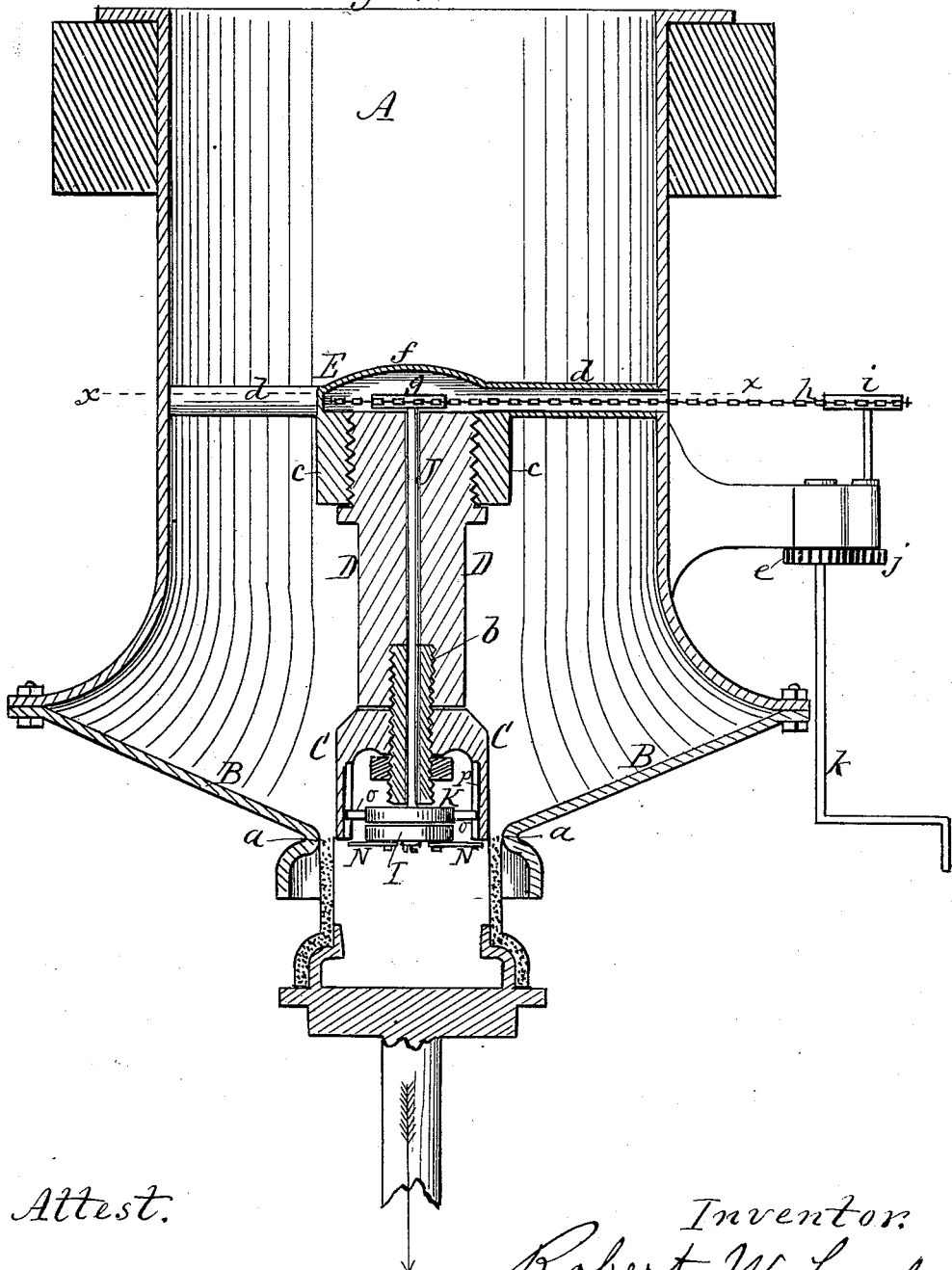

(No Model.) 3 Sheets—Sheet 1.

R. W. LYLE.
APPARTUS FOR CUTTING SEWER PIPE INTO SECTIONS.

No. 272,727. Patented Feb. 20, 1883.

Attest.
Chas. A. Wideney
R. E. White

Inventor.
Robert W. Lyle.
pr R. F. Osgood,
atty.

(No Model.) 3 Sheets—Sheet 2.
R. W. LYLE.
APPARTUS FOR CUTTING SEWER PIPE INTO SECTIONS.
No. 272,727. Patented Feb. 20, 1883.
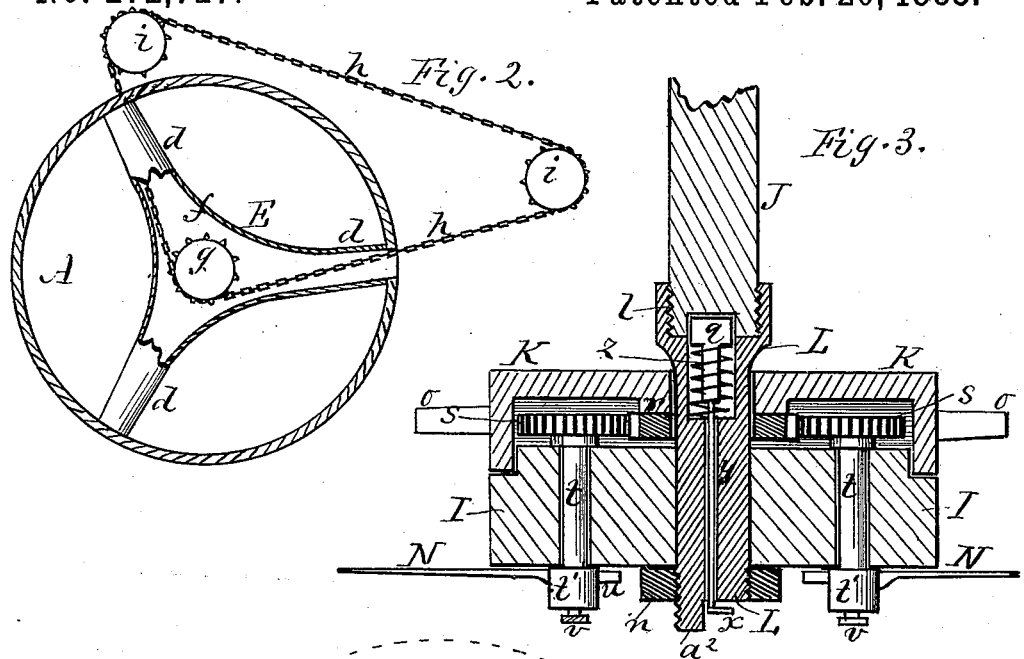
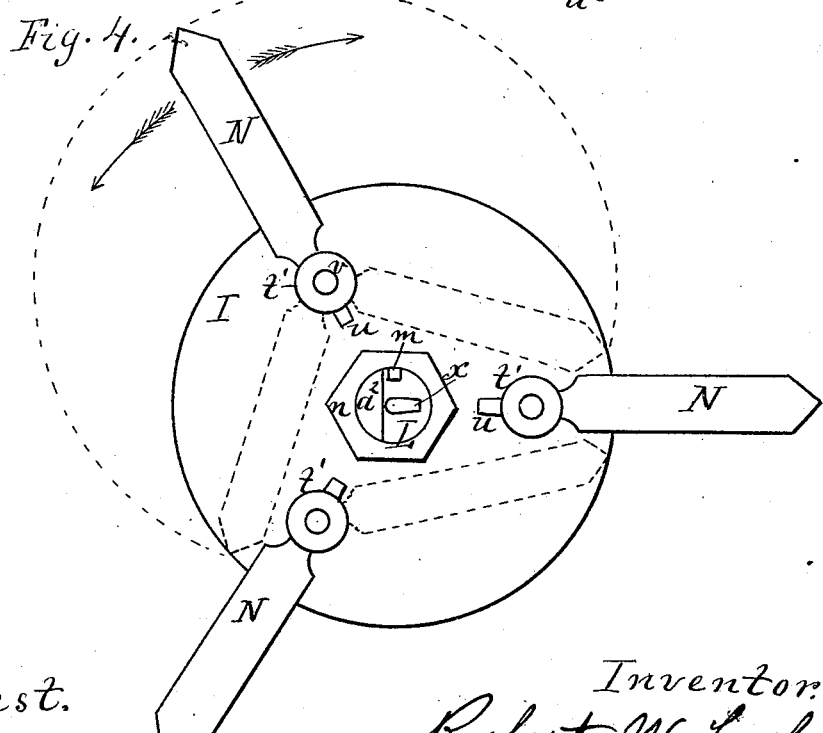
Attest.
Chas H Vidmer
R. E. White
Inventor.
Robert W. Lyle,
pr R. F. Osgood,
atty.
N. PETERS, Photo-Lithographer, Washington, D. C.

(No Model.) 3 Sheets—Sheet 3.
R. W. LYLE.
APPARTUS FOR CUTTING SEWER PIPE INTO SECTIONS.
No. 272,727. Patented Feb. 20, 1883.
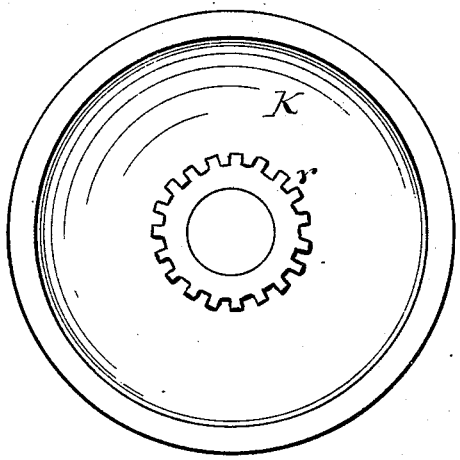
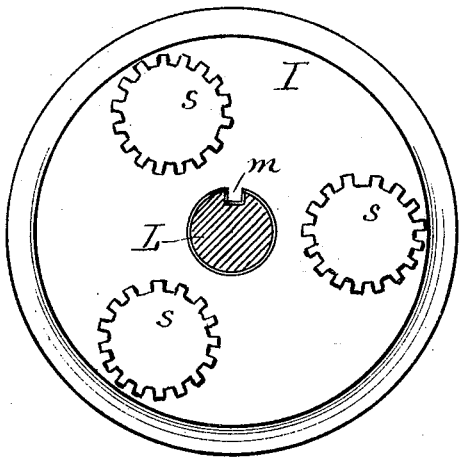
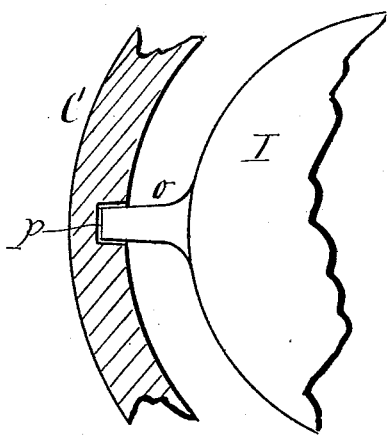
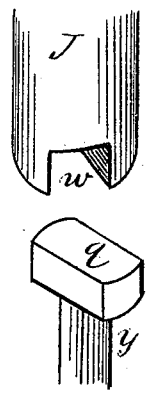
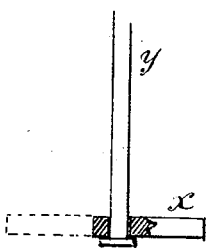
Attest.
Chas. A. Widener.
R. E. White
Inventor.
Robert W Lyle,
pr R. F. Osgood,
atty.

UNITED STATES PATENT OFFICE.

ROBERT W. LYLE, OF ROCHESTER, NEW YORK.

APPARATUS FOR CUTTING SEWER-PIPE INTO SECTIONS.

SPECIFICATION forming part of Letters Patent No. 272,727, dated February 20, 1883.

Application filed October 16, 1882. (No model.)

*To all whom it may concern:*

Be it known that I, ROBERT W. LYLE, of Rochester, Monroe county, New York, have invented a certain new and useful Improvement in Apparatus for Cutting Sewer-Pipe into Sections in the Act of Forming; and I do hereby declare that the following is a full, clear, and exact description of the same, reference being had to the accompanying drawings, in which—

Figure 1 is a central vertical section of a pipe-forming apparatus with my improvement applied thereto. Fig. 2 is a cross-section in line $x\ x$ on a reduced scale. Fig. 3 is a vertical section through the cutting apparatus on an enlarged scale. Fig. 4 is a bottom view of the disk or head, which carries the knives. Fig. 5 is a bottom view of the stationary disk or head. Fig. 6 is a top view of the revolving disk or head; Figs. 7, 8, and 9, detail views.

My improvement relates to means for cutting the length of pipe into sections in those machines where the pipe is formed by forcing clay under pressure through a die and onto a retreating follower. The knives are located within the hollow die in the throat of the machine, and when the length of one section of pipe is formed the knives are thrown out by suitable mechanism, a partial revolution is given to them, which causes them to sever the pipe, they are then retracted, and the formation of the next section of pipe goes on, and the action is repeated, thus making constant work. Knives of this kind have long been used, and I make no claim to them, broadly; but my invention consists in a new combination and arrangement of parts, whereby but a slight turning movement is required to sever the pipe, and it is done by moving the knives either way, thus making them double-acting, while in ordinary machines they are single-acting and there is much lost motion and waste of time.

So far as the forming of the pipe is concerned, the machine is of ordinary construction.

A is the cylinder, in which the clay is placed and through which it is forced by a piston. (Not shown in the drawings.)

B is an inclined hopper-shaped bottom to the cylinder, down which the clay passes to the throat $a$.

C is a cylindrical die in the throat, leaving only an annular outlet, and through this outlet the clay as it passes forms the shell of the pipe, as shown in Fig. 1.

D is a shank, to which the die is secured by means of a screw, $b$. The top of the shank screws into the hub $c$ of a spider, E, having two or more arms, $d\ d$, which are bolted to the inner sides of the cylinder A. The spaces between the arms allow the clay to pass down to the bottom of the hopper. The arms are hollow, and in the center of the spider is a hollow chamber, $f$, for the reception of the driving-wheel $g$, while the chain $h$, which drives the wheel, passes outward through the hollow arms and passes around similar wheels, $i\ i$, thus making a circuit, as shown in Fig. 2. The chain is driven by a crank-shaft, $k$, Fig. 1, having a spur-gear, $e$, at its top, engaging with a pinion, $j$. The operator, by turning the crank, operates the chain, and consequently the center driving-wheel, $g$.

J is a vertical shaft or spindle attached to the driving-wheel $g$, thence extending down through the shank D and die C, and having attached at its lower end and within the hollow die two disks or heads, I K, by which the knives are operated.

Thus far the machine is similar to others now in use. My improvement is as follows:

The two disks or heads rest on a bolt, L, which is screwed on the lower end of the spindle J, as shown at $l$, Fig. 3. The lower head, I, is fast with the bolt and revolves with it, being connected by a spline, $m$, and secured by a nut, $n$, which screws on the bolt beneath the head. This head carries the knives. The upper head, K, rests loosely around the bolt, and is kept from turning by any suitable means, that shown in the drawings being two projecting lugs, $o\ o$, cast on the sides, which rest and slide up and down in vertical slots $p\ p$ in the sides of the die C. This allows vertical adjustment to enable the knives to rest close up under the lower edge of the die in all cases, and the adjustment is made by placing washers either under or over the top of the disks or heads, as the case may require. These disks or heads are adapted to fit in different-sized dies for making different-sized pipes; hence the necessity for vertical adjustment.

*r* is a spur-gear set in the center of the upper head, K, and on the under side, which is chambered out, and the gear is made fixed in place.

*s s s* are two or more spur-gears on top of the revolving head I and engaging with gear *r*, said gears *s s s* being attached to shafts *t t t*, which pass through head I', and have hubs *t' t' t'* on the under side, in which rest the shanks *u u u* of the flat sharp-edge knives N N N, the shanks being held by set-screws *v v* or other means. As the lower head, I, is turned in one direction and the other the gears *s s s* will receive motion by traversing around the fixed gear *r*, and will impart rotary motion to the shafts *t t t* to the extent of part of a circle, and consequently the knives will also have a partial revolution around their centers. The sweep of the knives is shown in the plan view, Fig. 4, the full lines showing the knives thrown out their full extent to cut through the pipe, and the dotted lines showing them retracted or drawn in to allow the pipe to be formed. It should be understood that the knives in making their full sweep describe a large part of a circle, as indicated by the curved dotted line, starting from the retracted position, opening outward, and then retracting on the opposite side, and, in addition to this, the revolution of the disk or head to which the knives are attached carries the knives around bodily, so that a double cutting action is attained, first, by the revolution of the disk, and, second, by the turning movement of the knives themselves. Furthermore, the number of knives which can be used make it necessary to give but a limited turning movement to the head. The knives cut in moving in either direction forward or back. Hence, in cutting one section of pipe, the knives are simply moved forward and remain there till another section is formed, when they are moved back, doing the same work in cutting the second section. In all other machines of the kind with which I am acquainted there is one lost motion, the knives cutting only in one direction, and having to be moved back for a new cut. In all other machines with which I am aquainted also a much greater movement of the disk or head has to be given to produce the cut, owing to the form of the knives, which cannot be retracted or drawn in without forcing them back to the place of starting. One great advantage of my knives is that in making the cut they retract at the end of the sweep in either direction, and require no back action. There is not only a saving of much labor and time, but the work is better done.

The bolt L is screwed to the spindle J for the purpose of making it removable. In turning the spindle forward the screw tightens; but in turning back the tendency is to unscrew, since there is some resistance in operating the knives. I lock the parts together by the following means:

*w* is a cross-slot formed in the lower end of the spindle J.

*q* is a small block, which fits in the slot, having a stem, *y*, which extends down through the bolt L, provided with a bent swivel end, *x*. A coiled spring, *z*, in a socket of the bolt, forces the block up into the slot, but allows it to retract when the stem is drawn down. On the lower end of the bolt L is a projecting lug, $a^2$, which stands alongside the bent end of the stem. In its natural position the bent end is turned away from the lug, which allows the spring to force the block up into the slot; but by drawing the stem down and turning the end of the same, so as to hook onto the lug, as shown by the dotted lines, Fig. 3, the block is drawn down out of the slot, and the bolt L can then be disengaged from the spindle. The advantage of this arrangement is that the bolt is locked to the spindle, so that it can be turned in either direction without loosening the screw, and yet the bolt with the disks or heads attached can be removed at any time, or adjustments higher or lower can be made without difficulty.

Having thus described my invention, I disclaim the broad feature of a knife or knives attached to a turning disk or head and used for cutting the sections of pipe.

What I claim as new, and desire to secure by Letters Patent, is—

1. In an apparatus for cutting pipe into sections, the combination, with the turning head I, of the knives N N, attached to shafts passing through the head and receiving motion from internal gearing, the knives sweeping forward and back by the alternate turning of the head and cutting the pipe in both directions, as herein set forth.

2. In an apparatus for cutting pipe into sections, the combination of the turning head I, the shafts *t t*, passing through the head, the knives N N, attached to the shafts under the head, and the gears *s s*, attached to the shafts above the head and engaging with a fixed gear, whereby as the head is turned forward and back the knives receive a corresponding forward-and-backward motion, as herein shown and described.

3. In an apparatus for cutting pipe into sections, the combination, with a revolving disk or head, of knives attached to shafts passing through the head and receiving rotary motion by gears, the shafts being set on one side of the center of the head, so that as turning motion is imparted to the head the knives, in making their sweep, will close in to the periphery of the head at the full end of their stroke in either direction, as herein set forth.

4. In an apparatus for cutting pipe into sections, the combination of the two heads I K, one turning and the other stationary, the knives N N, attached to shafts *t t* of the turning head, and having gears *s s* on the ends of the shafts, the stationary head having a fixed gear, *r*, with which the gears *s s* engage, as shown and described, and for the purpose specified.

5. In an apparatus for cutting pipe into sections, the combination, with the spindle J and bolt L, of the slot $w$, formed in the end of the spindle, and the block $q$, fitting in the slot, the stem $y$ extending down from the block, and the spring $z$ for forcing the block into the slot, as herein shown and described.

6. The combination of the lug $a^2$, formed on the end of bolt L, the block $q$, fitting in a slot in the end of the spindle J, the stem $y$, extending down from the block, the spring $z$ for forcing the block up, and the bent swivel end $x$ on the end of the stem, for engaging with the lug on the bolt, as herein shown and described.

In witness whereof I have hereunto signed my name in the presence of two subscribing witnesses.

ROBERT W. LYLE.

Witnesses:
R. F. OSGOOD,
E. H. BURGHARDT.